United States Patent
Park

(10) Patent No.: US 8,027,675 B2
(45) Date of Patent: Sep. 27, 2011

(54) APPARATUS AND METHOD FOR CONTROLLING REGISTRATION OF MOBILE IDENTIFICATION NUMBER OF MOBILE COMMUNICATION TERMINALS

(75) Inventor: Sang-Kyun Park, Siheung-si (KR)

(73) Assignee: Samsung Electronics Co., Ltd (KR)

( * ) Notice: Subject to any disclaimer, the term of this patent is extended or adjusted under 35 U.S.C. 154(b) by 1232 days.

(21) Appl. No.: 11/116,867

(22) Filed: Apr. 28, 2005

(65) Prior Publication Data

US 2006/0135122 A1    Jun. 22, 2006

(30) Foreign Application Priority Data

Dec. 16, 2004 (KR) .................. 10-2004-0106954

(51) Int. Cl.
*H04B 1/16* (2006.01)

(52) U.S. Cl. ................................ 455/435.1; 455/551
(58) Field of Classification Search ............... 455/435.1, 455/435.2, 551
See application file for complete search history.

(56) References Cited

U.S. PATENT DOCUMENTS

| 5,335,278 | A | * | 8/1994 | Matchett et al. ............. 380/248 |
| 5,428,666 | A | * | 6/1995 | Fyfe et al. ..................... 455/551 |
| 5,579,376 | A | * | 11/1996 | Kennedy et al. ............. 455/411 |
| 5,600,707 | A | * | 2/1997 | Miller, II ...................... 370/281 |
| 5,680,398 | A | * | 10/1997 | Robinson ..................... 370/458 |
| 5,708,710 | A | * | 1/1998 | Duda ............................ 380/247 |
| 5,734,977 | A | * | 3/1998 | Sanmugam .................... 455/410 |
| 5,881,145 | A | * | 3/1999 | Giuhat et al. ............. 379/221.13 |
| 5,890,075 | A | * | 3/1999 | Cyr et al. ...................... 455/560 |
| 5,913,164 | A | * | 6/1999 | Pawa et al. ................... 455/427 |
| 5,915,224 | A | * | 6/1999 | Jonsson ...................... 455/552.1 |
| 5,933,418 | A | * | 8/1999 | Massingill et al. ........... 370/321 |
| 5,978,669 | A | * | 11/1999 | Sanmugam .................... 455/410 |
| 6,047,174 | A | * | 4/2000 | Frederick ...................... 455/410 |
| 6,185,198 | B1 | * | 2/2001 | LaDue ........................... 370/329 |
| 6,185,416 | B1 | * | 2/2001 | Rudokas et al. .............. 455/410 |
| 6,215,996 | B1 | * | 4/2001 | Fujita .......................... 455/422.1 |
| 6,240,293 | B1 | * | 5/2001 | Koster .......................... 455/445 |
| 6,240,295 | B1 | * | 5/2001 | Kennedy et al. ........... 455/456.4 |
| 6,295,449 | B1 | * | 9/2001 | Westerlage et al. ........ 455/422.1 |
| 6,311,063 | B1 | * | 10/2001 | Valliani et al. ............... 455/433 |
| 6,370,373 | B1 | * | 4/2002 | Gerth et al. ................... 455/410 |
| 6,389,059 | B1 | * | 5/2002 | Smith et al. ................... 375/141 |
| 6,453,174 | B1 | * | 9/2002 | Cunningham et al. ........ 455/560 |

(Continued)

FOREIGN PATENT DOCUMENTS

KR    2003-11902    *    2/2003

*Primary Examiner* — Lester Kincaid
*Assistant Examiner* — Diego Herrera
(74) *Attorney, Agent, or Firm* — The Farrell Law Firm, P.C.

(57) ABSTRACT

An apparatus and method for controlling registration of a mobile identification number (MIN) of a mobile communication terminal. A memory stores a table in which MIN groups uniquely assigned to common carriers are stored, and a MIN of a mobile communication terminal. An input device inputs a MIN to be stored in the memory. If the MIN stored in the memory is a default MIN, a controller replaces the MIN stored in the memory with the MIN input from the input device. If the MIN stored in the memory is not the default MIN and the input MIN belongs to a MIN group assigned to a common carrier corresponding to the stored MIN, the controller replaces the stored MIN with the input MIN.

10 Claims, 3 Drawing Sheets

U.S. PATENT DOCUMENTS

| | | | |
|---|---|---|---|
| 6,560,455 B2 * | 5/2003 | Amin et al. | 455/432.3 |
| 6,625,451 B1 * | 9/2003 | La Medica et al. | 455/434 |
| 6,643,318 B1 * | 11/2003 | Parsa et al. | 375/141 |
| 6,697,637 B1 * | 2/2004 | Willey | 455/551 |
| 6,738,647 B1 * | 5/2004 | Link, II | 455/564 |
| 6,778,828 B1 * | 8/2004 | Chander et al. | 455/435.1 |
| 6,799,038 B2 * | 9/2004 | Gopikanth | 455/435.2 |
| 6,856,804 B1 * | 2/2005 | Ciotta | 455/435.1 |
| 6,879,825 B1 * | 4/2005 | Daly | 455/419 |
| 6,889,325 B1 * | 5/2005 | Sipman et al. | 713/176 |
| 6,957,066 B1 * | 10/2005 | Stammers et al. | 455/435.1 |
| 6,975,863 B1 * | 12/2005 | Miernik | 455/434 |
| 7,006,467 B2 * | 2/2006 | Anton et al. | 370/329 |
| 7,047,008 B2 * | 5/2006 | Martlew | 455/435.2 |
| 7,181,197 B2 * | 2/2007 | Clayton | 455/411 |
| 7,184,793 B2 * | 2/2007 | Kirbas et al. | 455/551 |
| 7,190,969 B1 * | 3/2007 | Oh et al. | 455/551 |
| 2002/0037724 A1 * | 3/2002 | Chatterjee et al. | 455/435 |
| 2002/0107011 A1 * | 8/2002 | Mazzarella et al. | 455/419 |
| 2003/0120553 A1 * | 6/2003 | Williams | 705/26 |
| 2003/0134660 A1 * | 7/2003 | Himmel et al. | 455/557 |
| 2003/0195000 A1 * | 10/2003 | Rodriguez | 455/435.1 |
| 2004/0023647 A1 * | 2/2004 | Mazzara et al. | 455/419 |
| 2004/0127218 A1 * | 7/2004 | Paik et al. | 455/435.1 |
| 2004/0162068 A1 * | 8/2004 | Lamb et al. | 455/432.1 |
| 2004/0166893 A1 * | 8/2004 | Jang | 455/551 |
| 2004/0203692 A1 * | 10/2004 | Schwinke et al. | 455/419 |
| 2004/0203777 A1 * | 10/2004 | Watanabe et al. | 455/435.2 |
| 2004/0242243 A1 * | 12/2004 | Luis | 455/461 |
| 2004/0250245 A1 * | 12/2004 | Rao et al. | 717/168 |
| 2005/0043041 A1 * | 2/2005 | Ignatius et al. | 455/456.2 |
| 2005/0090286 A1 * | 4/2005 | Griffith et al. | 455/558 |
| 2005/0153741 A1 * | 7/2005 | Chen et al. | 455/558 |

* cited by examiner

|  | COMMON CARRIER A | COMMON CARRIER B | COMMON CARRIER C | ... |
|---|---|---|---|---|
| ASSIGNED MIN | 1~10 | 11~20 | 21~30 | ... |

FIG.3

APPARATUS AND METHOD FOR CONTROLLING REGISTRATION OF MOBILE IDENTIFICATION NUMBER OF MOBILE COMMUNICATION TERMINALS

PRIORITY

This application claims priority under 35 U.S.C. §119 to an application entitled "Apparatus and Method for Controlling Registration of Mobile Identification Number of Mobile Communication Terminal" filed in the Korean Intellectual Property Office on Dec. 16, 2004 and assigned Serial No. 2004-106954, the contents of which are incorporated herein by reference.

BACKGROUND OF THE INVENTION

1. Field of the Invention

The present invention relates generally to a mobile identification number (MIN) of a mobile communication terminal, and in particular, to an apparatus and method for controlling registration of a MIN of a mobile communication terminal.

2. Description of the Related Art

Common carriers (mobile communication service providers) assign a unique mobile identification number (MIN) to each subscriber, and mobile communication terminal manufacturers assign a unique electronic serial number (ESN) to each mobile terminal. The MIN is a 10-digit number and its numbering system mirrors the phone numbering system for wire subscribers. The MIN is divided into MIN1 and MIN2. The MIN2 is a number assigned to each common carrier, such as 011, 016, 017, and 019, while the MIN1 is a serial number (normally comprised of 7 digits) assigned to each subscriber. The ESN is an identifier (ID) uniquely assigned to each mobile terminal and is used for call processing. The ESN is comprised of 32 bits and its 8 most significant bits (MSB) are designated for a manufacturer's identification number. The MIN can be changed by the common carrier. However, the 32-bit ESN cannot be changed once assigned.

In general, once a subscriber subscribes to a communication service, a MN is assigned to the subscriber, and the assigned MIN and ESN of the mobile communication terminal are stored together in a subscriber database of the corresponding common carrier. Whenever a call is attempted, the subscriber is authenticated using the ESN and MN in the database.

In further detail, for subscriber communication, the mobile communication terminal detects a signaling channel with a base station, tunes to the signaling channel and sends its hexadecimal ESN to the base station in response to subscriber dialing. The base station receives the MN and ESN from the mobile communication terminal and transmits them to a mobile switching center (MSC). The mobile switching center compares the received MIN and ESN with those stored in the subscriber database for authentication. If the mobile switching center identifies the subscriber as an authorized subscriber, it establishes a call over a public switched telephone network or a mobile phone network and assigns a voice channel to form a speech path.

Due to high mobility provided by mobile communication services adopting the cellular concept, the demand for mobile communication service is increasing exponentially. With this, the number of incidents of mobile communication identity theft—where someone illegally copies and uses a phone number—increases as well.

Manufacturers of mobile communication terminals record the ESN for each terminal in a read only memory (ROM) embedded in the mobile communication terminal during manufacture at the factory. After purchasing the mobile communication terminal, the user submits a subscription request to a common carrier and is assigned a MIN. From that point on, the common carrier allows the user (mobile phone subscriber) to use the mobile communication terminal (mobile phone).

In some countries, the mobile communication terminals are sold at below production cost to attract more subscribers. As a result, some dealers or users buy terminals at these low prices, register the mobile communication terminals, and then resell them on the black market. The black market users then subscribe to a mobile communication service provided by another common carrier in the same or another country.

To obviate the problem, companies that develop and sell mobile communication terminals create and provide a MIN lock feature for each country and each common carrier. However, if a mobile communication terminal has a MIN lock feature for each country and each common carrier, when the user registers an initial common carrier to the mobile communication terminal, only a common carrier corresponding to a predetermined MIN group can be registered. In other words, a common carrier having a different MIN group from the predetermined MIN group cannot be registered. Therefore, when the user registers the initial common carrier, the user cannot freely select a common carrier he/she wants.

SUMMARY OF THE INVENTION

It is, therefore, an object of the present invention to provide an apparatus and method for allowing a user to freely select one of various common carriers and initially register a mobile communication terminal having a MIN lock feature for the selected common carrier.

It is another object of the present invention to provide an apparatus and method for allowing a user to re-register a mobile communication terminal only in a common carrier in which the user first registered the mobile communication terminal.

In accordance with one aspect of the present invention, there is provided an apparatus for controlling registration of a mobile identification number (MIN) of a mobile communication terminal. In the apparatus, a memory stores a table in which MIN groups uniquely assigned to common carriers are stored, and the MIN of the mobile communication terminal. An input device inputs a MIN to be stored in the memory. If the MIN stored in the memory is a default MIN, a controller replaces the MIN stored in the memory with the MIN input from the input means. If the MIN stored in the memory is not the default MIN and the input MIN belongs to a MIN group assigned to a common carrier corresponding to the stored MIN, the controller replaces the stored MIN with the input MIN.

In accordance with another aspect of the present invention, there is provided a method for controlling registration of a mobile identification number (MIN) of a mobile communication terminal. The method includes inputting a MIN to be stored in the mobile communication terminal; if a currently stored MIN is a default MIN, replacing the stored MIN with the input MIN, and if the currently stored MIN is not the default MIN, checking if the input MIN belongs to a MIN group assigned to a common carrier corresponding to the currently stored MIN; and replacing the currently stored MN with the input MIN if the input MIN belongs to the MIN group assigned to the common carrier corresponding to the currently stored MIN.

BRIEF DESCRIPTION OF THE DRAWINGS

The above and other objects, features and advantages of the present invention will become more apparent from the following detailed description when taken in conjunction with the accompanying drawings in which:

FIG. 3 illustrates a table in which MIN groups uniquely assigned to common carriers for MIN registration are stored, according to an embodiment of the present invention.

DETAILED DESCRIPTION OF THE PREFERRED EMBODIMENT

A preferred embodiment of the present invention will now be described in detail with reference to the annexed drawings. In the following description, a detailed description of known functions and configurations incorporated herein has been omitted for conciseness.

When the same mobile communication terminals are sold to various common carriers, i.e., when the same mobile communication terminals are sold on the open market, the present invention restricts registration of the terminal and transfer of ownership of the terminal to the initial common carrier selected by the original user, while preventing other common carriers from registering the mobile communication terminal.

Figure 1:
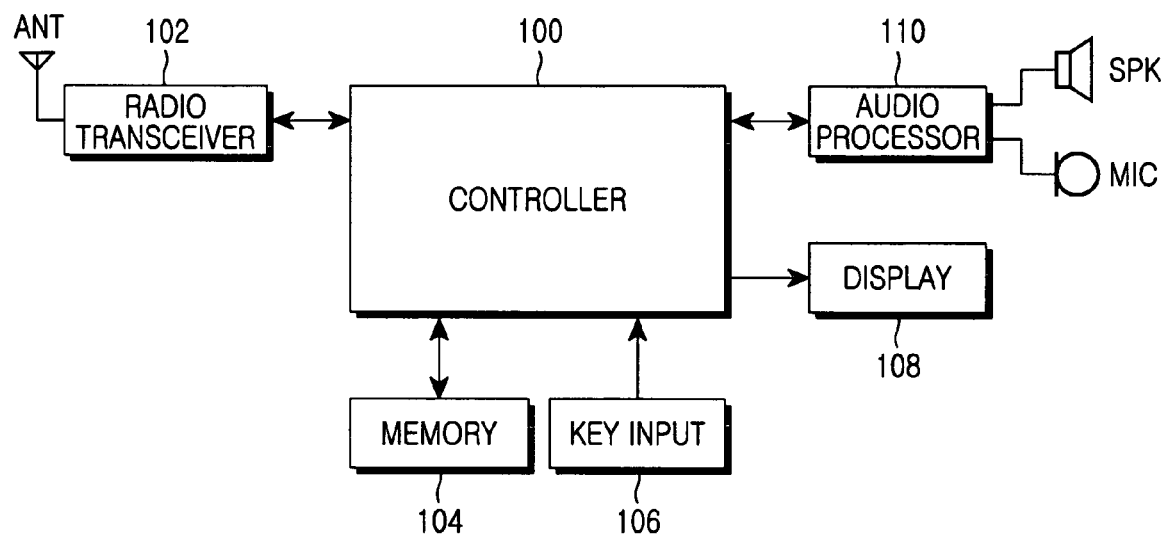
FIG. 1 is an internal block diagram of a general mobile communication terminal to which the present invention is applied.

With reference to FIG. 1, a description will now be made of an internal structure of a general mobile communication terminal to which the present invention is applied.

FIG. 1 is an internal block diagram of a general mobile communication terminal to which the present invention is applied. Referring to FIG. 1, a controller 100 controls various functions including telephone calls, data communication, and Internet access, and has the function of controlling MIN registration according to an embodiment of the present invention. For simplicity, the general control operation of the controller 100 will not be described. A radio transceiver 102 transmits and receives radio signals to and from a base station through an antenna "ANT". For signal transmission, the radio transceiver 102 modulates a transmission signal input from the controller 100 into a radio frequency (RF) signal, and transmits the RF signal through the antenna "ANT". For signal reception, the radio transceiver 102 demodulates an RF signal received through the antenna "ANT" and provides the demodulated RF signal to the controller 100. A memory 104 stores programs executed by the controller 100 and data processed by the programs. The memory 104 is comprised of a read only memory (ROM) or an electrically erasable programmable ROM (EEPROM) for storing the programs, and a random access memory (RAM) for temporarily storing the data.

In an embodiment of the present invention, the memory 104 stores a table like that in FIG. 3, in which MIN groups are uniquely assigned to common carriers. In general, MINs range from 10000 to 9999999999. The MINs are divided into MIN sets uniquely assigned to respective countries, and each of the MIN sets assigned to the countries is subdivided into MIN groups uniquely assigned to respective common carriers in a corresponding country.

Referring back to FIG. 1, a key input unit 106 includes number keys 0 through 9 and a plurality of function keys including a Menu key, a Call key, a Cancel key, an End key, a *-key, a #-key, and a volume key, and provides key input data corresponding to a key pressed by a user to the controller 100. A display 108 displays image information on its screen under the control of the controller 100. An audio processor 110 converts audio data into an electric signal and outputs the electric signal to a speaker "SPK". The speaker "SPK" converts the electric signal into an audible sound. A microphone "MIC" and the speaker "SPK", both connected to the audio processor 110, constitute a voice input/output block used for phone conversations, voice recording, bell sound output, and alarm sound output.

Figure 2:
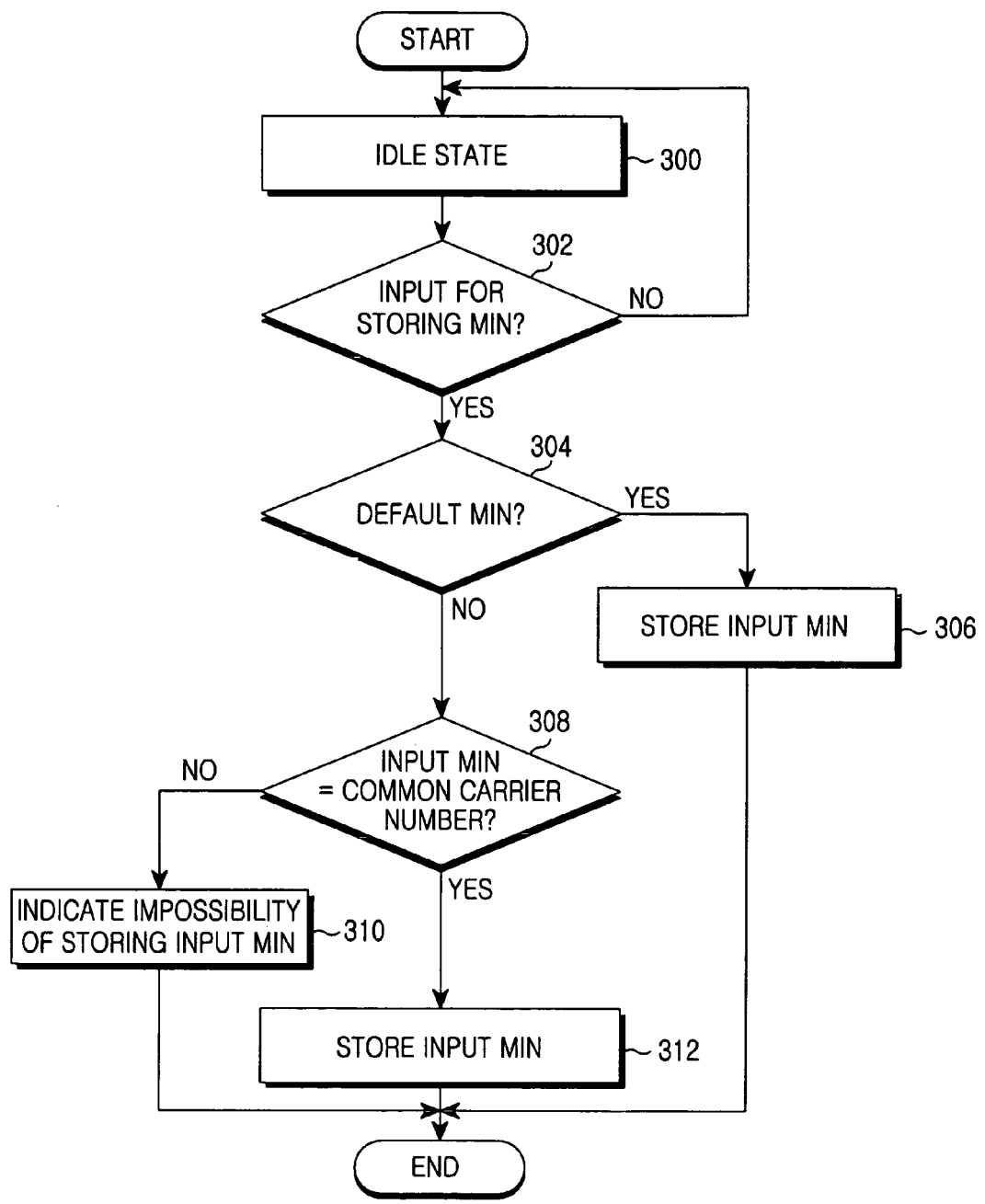
FIG. 2 is a control flowchart illustrating a process of controlling registration of a changed input MIN of a mobile communication terminal according to an embodiment of the present invention.

With reference to FIG. 2, a description will now be made of a control process of storing a MIN in a mobile communication terminal.

FIG. 2 is a control flowchart illustrating a process of controlling registration of a changed input MIN of a mobile communication terminal according to an embodiment of the present invention. Referring to FIG. 2, the controller 100 maintains an idle state in step 300 and determines whether an input for storing a MIN is received in step 302. If an input for storing a MIN is received, the controller 100 checks if a MIN stored in the memory 104 is a default MIN in step 304. If the MIN is the default, the controller 100 stores the input MIN in memory 104 in step 306. In other words, a user who buys a mobile communication terminal with a default MIN stored therein can select a common carrier and register MIN the selected common carrier MIN in the mobile communication terminal.

If the MIN stored in the memory 104 is determined not to be the default MIN in step 304, the controller 100 checks if the input MIN belongs to a MIN group assigned to a corresponding common carrier in step 308. At this time, the controller 100 checks whether the input MIN belongs to a MIN group assigned to an initial common carrier by referring to a table stored in the memory 104. The table stores MIN groups uniquely assigned to common carriers.

If the input MIN is determined to belong to a MIN group assigned to a corresponding common carrier in step 308, the controller 100 replaces the MIN stored in the memory 104 with the input MIN in step 312.

However, if the input MIN does not belong to the MIN group assigned to the corresponding common carrier in step 308, the controller 100 informs the user that the input MIN cannot be stored in step 310. The controller 100 may inform the user through the display 108 or an alarm sound output by the audio processor 110.

The process of controlling registration of an input MIN will now be described with reference to FIG. 3. Herein, it is assumed that the initially registered MIN is "14."

The controller 100 of the mobile communication terminal recognizes that the mobile communication terminal is registered in a common carrier B. Assuming that "24" is input to replace the initially registered MIN, since "24" belongs to a MIN group assigned to a common carrier C, the controller 100 recognizes that the common carrier corresponding to the input MIN is different from the common carrier corresponding to the initially registered MIN and informs the user that the input MIN cannot be stored.

On the other hand, if "19" is input for replacing the initially registered MIN, since "19" belongs to a MIN group assigned to the common carrier B, the controller 100 recognizes that the common carrier corresponding to the input MIN is identical to the common carrier corresponding to the initially registered MIN and replaces the initially registered MIN stored in the memory 104 with the input MIN.

As described above, the present invention allows a user to freely select one of various common carriers and initially register a mobile communication terminal having a MIN lock feature for the selected common carrier. The present invention also allows a user to re-register a mobile communication terminal only in a common carrier in which the user first registered the mobile communication terminal.

As can be understood from the foregoing description, the present invention allows only the initial, original common carrier that is initially selected by the first and original user of a mobile communication terminal to register the mobile communication terminal, and allows transfer of ownership when the mobile communication terminal has a MIN lock feature for respective common carrier and is sold on the open market, i.e., when the same mobile communication terminals are sold to various countries and common carriers. Thus, other common carriers, except for the one who initially registers the mobile communication terminal, are prevented from registering the mobile communication terminal, thereby reducing illicit sale of mobile communication terminals and related damages.

While the invention has been shown and described with reference to a certain preferred embodiment thereof, it will be understood by those skilled in the art that various changes in form and details may be made therein without departing from the spirit and scope of the invention.

What is claimed is:

1. An apparatus for controlling registration of a mobile identification number (MIN) of a mobile communication terminal, the apparatus comprising:
   a memory for storing a table in which MIN groups uniquely assigned to common carriers are stored, and for storing the MIN of the mobile communication terminal;
   an input means for inputting another MIN to be stored in the memory; and
   a controller for replacing the MIN stored in the memory with the another MIN
   when the MIN stored in the memory is a default MIN, replacing the stored MIN with the another MIN when the MIN stored in the memory is not the default MIN and the another MIN belongs to a MIN group assigned to a common carrier corresponding to the stored MIN and,
   discarding the another MIN when the another MIN does not belong to the MIN group assigned to the common carrier corresponding to the stored MIN.

2. The apparatus of claim 1, wherein the controller checks if the another MIN belongs to a MIN group assigned to an initial common carrier by referring to the table stored in the memory.

3. A method for controlling registration of a mobile identification number (MIN) of a mobile communication terminal, the method comprising the steps of:
   inputting a MIN to be stored in the mobile communication terminal;
   when a currently stored MIN is a default MIN, replacing the stored MIN with the input MIN, and when the currently stored MIN is not the default MIN, checking whether the input MIN belongs to a MIN group assigned to an initial common carrier among a plurality of MIN groups stored in a table stored in a memory of the terminal; and
   replacing the currently stored MIN with the input MIN when the input MIN belongs to the MIN group assigned to the common carrier corresponding to the currently stored MIN.

4. The method of claim 3, further comprising discarding the input MIN if the input MIN does not belong to the MIN group assigned to the common carrier corresponding to the currently stored MIN.

5. The method of claim 3, wherein it is checked if the input MIN belongs to a MIN group assigned to an initial common carrier by referring to the table stored in the memory.

6. An apparatus for controlling registration of a mobile identification number (MIN) of a mobile communication terminal, the apparatus comprising:
   a memory for storing a table in which MIN groups uniquely assigned to common carriers are stored, and for storing the MIN of the mobile communication terminal;
   an input means for inputting another MIN; and
   a controller for checking whether the another MIN belongs to a MIN group assigned to a common carrier corresponding to the MIN stored in the memory to determine whether to store the another MIN, and
   replacing the currently stored MIN with the input MIN, when the input MIN belongs to the MIN group assigned to the common carrier corresponding to the currently stored MIN.

7. The apparatus of claim 6, wherein the controller discards the another MIN if the another MIN does not belong to the MIN group assigned to the common carrier corresponding to the MIN stored in the memory.

8. A method for controlling registration of a mobile identification number (MIN) of a mobile communication terminal, the method comprising the steps of:
   inputting a MIN;
   checking whether the input MIN belongs to a MIN group assigned to an initial common carrier among a plurality of MIN groups stored in a table previously stored in a memory of the terminal;
   storing the input MIN according to the checked result; and
   replacing the previously stored MIN with the input MIN when the input MIN belongs to the MIN group assigned to the common carrier corresponding to the previously stored MIN.

9. The method of claim 8, further comprising discarding the input MIN if the input MIN does not belong to the MIN group assigned to the common carrier corresponding to the previously stored MIN.

10. The method of claim 9, further comprising
    providing a user with information indicating that the input MIN cannot be stored in the mobile communication terminal.

* * * * *